US009477283B2

(12) United States Patent
Gerber et al.

(10) Patent No.: US 9,477,283 B2
(45) Date of Patent: *Oct. 25, 2016

(54) METHODS, DEVICES, AND COMPUTER PROGRAM PRODUCTS FOR PROVIDING A COMPUTING APPLICATION RATING

(71) Applicants: AT&T Intellectual Property I, L.P., Atlanta, GA (US); The Regents of the University of Michigan, Ann Arbor, MI (US)

(72) Inventors: Alexandre Gerber, Madison, NJ (US); Zhuaqing Mao, Ann Arbor, MI (US); Feng Qian, Madison, MI (US); Subhabrata Sen, N. Providence, NJ (US); Oliver Spatscheck, Randolph, NJ (US); Zhaoguang Wang, Madison, MI (US)

(73) Assignees: AT&T Intellectual Property I, L.P., Atlanta, GA (US); The Regents of the University of Michigan, Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/679,621

(22) Filed: Apr. 6, 2015

(65) Prior Publication Data

US 2015/0212563 A1    Jul. 30, 2015

Related U.S. Application Data

(63) Continuation of application No. 13/172,925, filed on Jun. 30, 2011, now Pat. No. 9,003,017.

(51) Int. Cl.
| | |
|---|---|
| *G06F 15/16* | (2006.01) |
| *G06F 1/28* | (2006.01) |
| *G06F 11/30* | (2006.01) |
| *G06F 9/54* | (2006.01) |

(52) U.S. Cl.
CPC .. *G06F 1/28* (2013.01); *G06F 9/54* (2013.01); *G06F 11/302* (2013.01); *G06F 11/3062* (2013.01)

(58) Field of Classification Search
CPC .. G06F 1/3212; G06F 9/5094; G06F 1/3203; G06F 1/324; G06F 1/3206; G06F 1/3275; G06F 1/3293
See application file for complete search history.

(56) References Cited

U.S. PATENT DOCUMENTS

| | | | |
|---|---|---|---|
| 8,280,456 B2 * | 10/2012 | Hackborn et al. | 455/574 |
| 8,706,652 B2 * | 4/2014 | Yang et al. | 706/12 |
| 2008/0165714 A1 * | 7/2008 | Dettinger et al. | 370/311 |
| 2009/0077399 A1 * | 3/2009 | Noda et al. | 713/320 |
| 2009/0164152 A1 * | 6/2009 | Creus et al. | 702/63 |
| 2011/0040990 A1 | 2/2011 | Chan et al. | |
| 2011/0040996 A1 * | 2/2011 | Hackborn | G06F 11/3409 713/340 |
| 2011/0072378 A1 | 3/2011 | Numinen et al. | |
| 2012/0053925 A1 * | 3/2012 | Geffin et al. | 703/21 |
| 2012/0084028 A1 * | 4/2012 | Kumar et al. | 702/61 |
| 2013/0042122 A1 | 2/2013 | Hackborn et al. | |

OTHER PUBLICATIONS

Qian et al., "TOP: Tail Optimization Protocol for Cellular Radio Resource Allocation", IEEE (2010).
Qian et al., "Characterizing Radio Resource Allocation for 3G Networks", IMC, Melbourne Australia (Nov. 1-3, 2010).
U.S. Office Action dated Jun. 2, 2014 in U.S. Appl. No. 13/172,925.
U.S. Notice of Allowance dated Dec. 3, 2014 in U.S. Appl. No. 13/172,925.

\* cited by examiner

*Primary Examiner* — Djenane Bayard
(74) *Attorney, Agent, or Firm* — Hartman & Citrin LLC (57) ABSTRACT

A rating is provided for a computing application. Traffic data, power data, and/or network signaling load data is collected for a computing application and compared with other similar data. A rating for the computing application is provided based on the comparison.

17 Claims, 6 Drawing Sheets

METHODS, DEVICES, AND COMPUTER PROGRAM PRODUCTS FOR PROVIDING A COMPUTING APPLICATION RATING

CROSS REFERENCE TO RELATED APPLICATION

This application is a continuation of U.S. application Ser. No. 13/172,925, filed Jun. 30, 2011, now U.S. Pat. No. 9,003,017. The entirety of which is herein incorporated by reference.

TECHNICAL FIELD

The present disclosure relates generally to telecommunications, and, more particularly, to providing computing application ratings.

BACKGROUND

Users of wireless communication devices, such as smartphones, are provided with a wide array of applications. In selecting which applications to download and activate on their devices, users often consult application ratings. Typically, each application in an application store is rated based on feedback of other users indicating satisfaction with the application in terms of features, performance, etc. The information provided by such ratings, while somewhat useful, is limited.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the present disclosure.

According to an exemplary embodiment, a method provides a rating for a computing application. The method includes collecting, via a communication network, at least one of traffic data and power data. The traffic data includes data representative of traffic volume generated by usage of the computing application, and the power data includes data representative of power consumed by usage of the computing application. The method also includes comparing the traffic data with other traffic volume data and/or comparing the power data with other power consumption data. A rating is provided for the computing application based on the comparison.

According to another embodiment, a device provides a rating for a computing application. The device includes a receiver configured to collect at least one of traffic data and power data. The traffic data includes data representative of traffic volume generated by usage of the computing application, and the power data includes data representative of power consumed by usage of the computing application. The device also includes a processor configured to compare the traffic data with other traffic volume data and/or compare the power data with other power consumption data. A rating is provided for the computing application based on the comparison.

According to another embodiment, a tangible computer program product includes a storage medium upon which instructions are recorded that, when executed by a processor, perform acts for providing a rating for a computing application. The acts include collecting, via a communication network, at least one of traffic data and power data. The traffic data includes data representative of traffic volume generated by usage of the computing application, and the power data includes data representative of power consumed by usage of the computing application. The acts further include comparing the traffic data with other traffic volume data and/or comparing the power data with other power consumption data. A rating is provided for the computing application based on the comparison.

DETAILED DESCRIPTION

Detailed exemplary embodiments are disclosed herein. It must be understood that the embodiments described and illustrated are merely examples that may be embodied in various and alternative forms, and combinations thereof. As used herein, the word "exemplary" is used expansively to refer to embodiments that serve as examples or illustrations. The figures are not necessarily to scale and some features may be exaggerated or minimized to show details of particular components. Specific structural and functional details disclosed herein are not to be interpreted as limiting.

Traditionally, application developers designed computing applications for the personal computer user. As personal computers typically have ample power resources, developers and end users had little concern about power consumed by computing applications. Also, traffic volume generated by use of computing applications was not typically a large concern for personal computers, as end users were not typically billed according to data usage. For mobile communication devices, such as smart phones, power consumption is an important consideration because such devices often have limited power. In addition, because mobile communication device users are often billed according to data usage, traffic volume generated by use of applications by such devices becomes a very important consideration for end users.

According to exemplary embodiments, users of computing devices are provided with enhanced information regarding computing applications. Such information may include not only information regarding application features and performance, but also information regarding battery life/power consumed by usage of the application and/or traffic volume generated by usage of the application.

Figure 1:
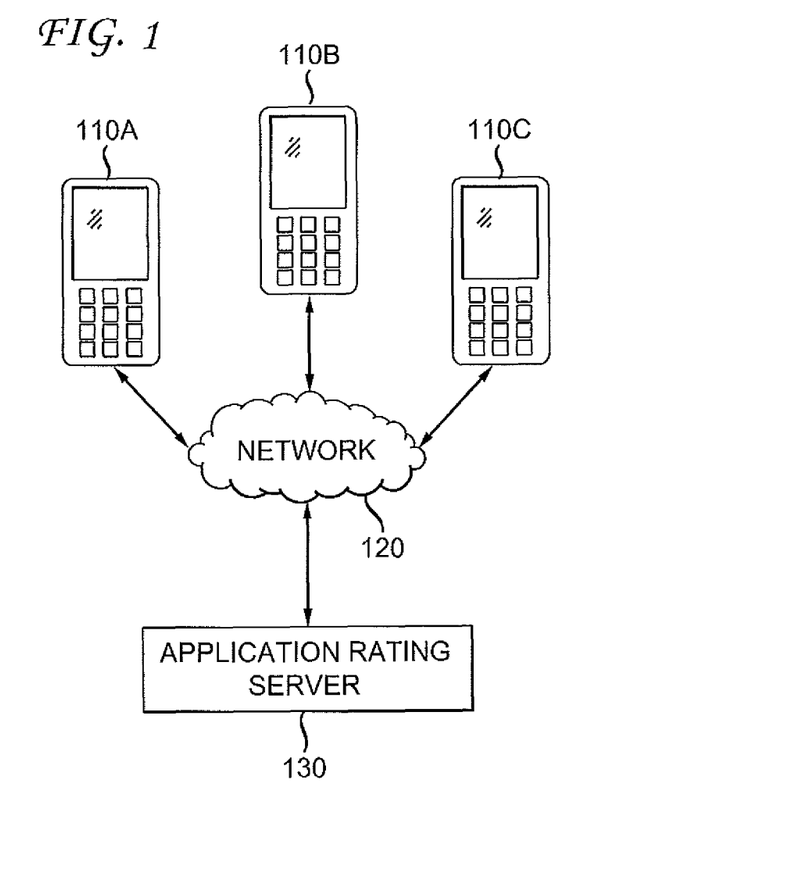
FIG. 1 illustrates a system for providing a rating for a computing application according to exemplary embodiments.

FIG. 1 illustrates an exemplary system for providing a rating for a computing application according to an exemplary embodiment. In the system shown in FIG. 1, one or more of the communication devices 110A, 110B, and 110C communicate with an application rating server 130 via a network 120. Information communicated to the application rating server 130 from the communication devices 110A, 110B, and 110C includes information indicating power consumed by and traffic volume generated by usage of computing applications. According to an exemplary embodiment "usage" may be quantified as usage during a session of the computing application, usage over a specified time period, etc.

To quantify traffic volume generated by usage of an application, such as usage by a mobile communication device or other computing device, various data indicating the traffic volume may be collected and evaluated. By way of example, the data indicating the traffic volume, in some embodiments, includes (i) traffic volume utilized per session, (ii) session duration, and/or (iii) session frequency collected at the communication devices 110A, 110B and 110C. The traffic volume generated may include a combination of traffic volume generated during an initial download of the application and/or traffic volume generated during subsequent usage of the application.

To quantify power consumed by usage of an application, the power consumed may be detected, e.g., by communication devices 110A, 110B, and 110C, and/or inferred or estimated. The power consumed may be inferred, e.g., by detecting a packet trace at the device indicating the timing of packets, associated with at least one application, arriving at and departing from the device. The packet trace may be used to simulate or estimate the state of a state machine of the device to infer wireless state and power consumed. Inferring may occur, e.g., at the application rating server 130 and/or at the device 110, as described in more detail below.

The application rating server 130 compares power consumption and/or traffic volume information collected in connection with a computing application to similar information regarding one or more other computing applications (or predetermined standard power consumption and traffic volume information) and provides one or more ratings for the computing application. Ratings may be combined into an overall rating for power consumption, traffic volume generation, and/or other information (e.g., user feedback), or separate ratings may be provided for power, traffic, and/or other information. According to one embodiment, traffic volume ratings may be provided in terms of traffic volume generated for downloading a computing application and/or traffic volume generated by executing/using the computing application.

According to one aspect, applications may be classified by category, e.g., weather applications. A particular application may be benchmarked within its category by comparing ratings of the particular application with ratings of other applications in the same category.

In addition to comparing collected power consumption and/or traffic volume information, the application rating server 130 may collect additional information regarding computing applications, e.g., user feedback, from, e.g., communication devices 110A, 110B and 110C. Ratings for a computing application may be generated based on the comparison of collected information with similar information for other computing applications and/or the comparison of collected information with predetermined or default information.

The ratings may be transmitted to the communication devices 110A, 110B, and 110C from the application rating server 130 and/or obtained by the communication devices 110A, 110B, and 110C and/or users of the devices via, e.g., a website to which the application rating server 130 has posted information. Thus, a communication device, e.g., device 110A, or user thereof, may obtain ratings for computing applications used by other communication devices, e.g., devices 110B and 110C. The ratings may be presented to an end user for use in determining whether to download and activate a computing application, as described in further detail below. The ratings information may be provided to an end user by way of any of a variety of outputs, such as via a display.

According to an exemplary embodiment, the ratings information may be provided via, e.g., a website for an application store hosted by an application store provider or another computing application provider in communication with the application rating server 130 (not shown). The ratings information may be used by a provider of an application store or other provider of computing applications, e.g., to decide what applications to offer end users. In addition, or as an alternative, ratings information may be provided to an end user via, e.g., a website other than the application store, either independently of application ratings or in conjunction with application ratings. The power consumption, traffic volume, and ratings information may also be provided back to an application developer for use in improving the application, determining how the application compares with other applications, etc.

The communication devices 110A, 110B, and 110C may be implemented as mobile communication devices, such as the device 110 described in detail below with reference to FIG. 2. Alternatively, one or more of the communication devices 110A, 110B, and 110C may be implemented as personal computing devices, e.g., a desktop or laptop computer. Some devices may be considered as a mobile communication device and a personal computing device, such as smart phones, and mobile tablet PCs, for example.

Although three communication devices 110A, 110B, and 110C are shown in FIG. 1 for illustrative purposes, it should be appreciated that any number of communication devices may provide information to the application rating server 130 for use in rating computing applications and obtain ratings for computing applications from the application rating server 130.

The application rating server 130 may be implemented as a device, such as the device 400 described in further detail below with reference to FIG. 4. The network 120 may be implemented as one or more wireless networks or Radio Access Networks (RANs) that use exemplary telecommunications standards, such as Global System for Mobile communications (GSM) and Universal Mobile Telecommunications Systems (UMTS). It should be understood, however, that the network 120 may also be any existing wireless or wireline network including any existing or yet to be developed telecommunications technology. Some examples of other suitable telecommunication technologies include, but are not limited to, networks utilizing Time Division Multiple Access (TDMA), Frequency Division Multiple Access (FDMA), Wideband Code Division Multiple Access (WCDMA), Orthogonal Frequency Division Multiplexing (OFDM), Long Term Evolution (LTE), and various other 2G, 2.5G, 3G, 4G, and greater generation technologies. Examples of suitable data bearers include, but are not limited to, General Packet Radio Service (GPRS), Enhanced Data rates for Global Evolution (EDGE), the High-Speed Packet Access (HSDPA) protocol family, such as High-Speed Downlink Packet Access (HSDPA), Enhanced Uplink (EUL) or otherwise termed High-Speed Uplink Packet Access (HSUPA), Evolved HSPA (HSPA+) and various other current and future data bearers.

Figure 2:
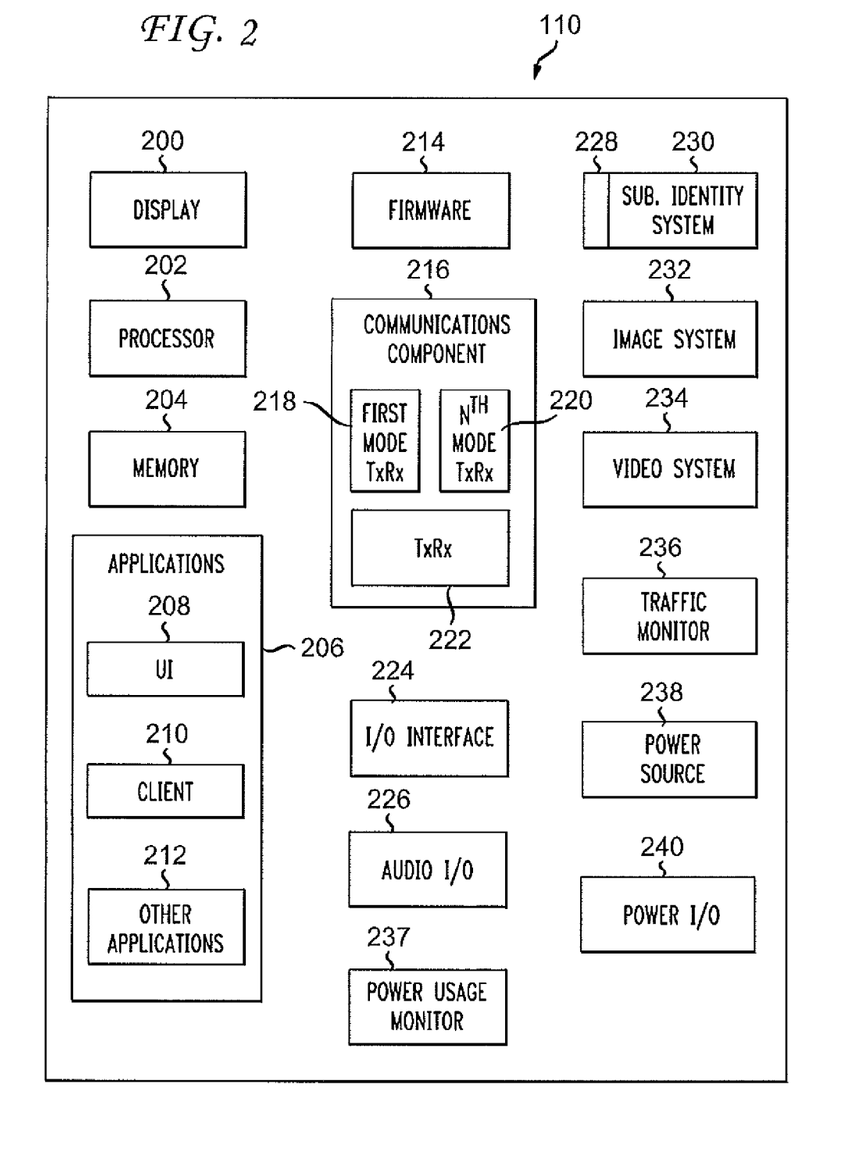
FIG. 2 illustrates a communication device for use in a system for providing a rating for a computing application according to exemplary embodiments.

FIG. 2 illustrates a schematic block diagram of an exemplary device 110 according to exemplary embodiments. Although no connections are shown between the components illustrated in FIG. 2, those skilled in the art will appreciate that the components can interact with each other via any suitable connections to carry out device functions.

It should be understood that FIG. 2 and the following description are intended to provide a brief, general description of a suitable environment in which the various aspect of some embodiments of the present disclosure can be implemented. While the description includes a general context of computer-executable instructions, the present disclosure can also be implemented in combination with other program modules and/or as a combination of hardware and software. The term "application", or variants thereof, is used expansively herein to include routines, program modules, program, components, data structures, algorithms, and the like. Applications can be implemented on various system configurations, including single-processor or multiprocessor systems, minicomputers, mainframe computers, personal computers, handheld-computing devices, microprocessor-based, programmable consumer electronics, combinations thereof, and the like.

Referring to FIG. 2, a device 110 may be implemented with a multimode handset and can include a variety of computer-readable media, including volatile media, non-volatile media, removable media, and non-removable media. The term "computer-readable media" and variants thereof, as used in the specification and claims, can include storage media. Storage media can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium that can be used to store information that can be accessed by the device 110.

The device 110 may include a display 200 for displaying multimedia, such as, for example, text, images, video, and telephone functions, such as Caller ID data, setup functions, menus, music metadata, messages, wallpaper, graphics, Internet content, device status, preference settings, and the like.

According to exemplary embodiment, the display 200 may display application ratings for various computing applications, which may be obtained, e.g., from an application store website. Also, the display 200 may indicate traffic volume and power consumption during use of a computing application.

The device 110 may include a processor 202 for controlling and/or processing data. A memory 204 can interface with the processor 202 for the storage of data and/or applications 206.

The applications 206 may also include a user interface (UI) application 208. The UI application 208 can interact with a client 210 (e.g., an operating system) to facilitate user interaction with device functionality and data, for example, entering message content, viewing received messages, answering/initiating calls, entering/deleting data, password entry and settings, configuring settings, address book manipulation, and the like. Such user interaction may be facilitated via, e.g., a keypad or a touchscreen included in the device 110 or communicating with the device via the I/O interface 224.

The applications 206 may include other applications 212, such as, for example, SMS messaging software, EMS message software, MMS messaging software, USSD software, a WAP browser, add-ons, plug-ins, email applications, music applications, video applications, camera applications, location-based service (LSB) applications, power conservation applications, game applications, productivity applications, entertainment applications, combinations thereof, and the like, as well as subsystem and/or components. According to exemplary embodiments, the applications may also include applications for determining power consumption and traffic volume, described in more detail below.

The applications 206 can be stored in the memory and/or in firmware components 214 and can be executed by the processor 202. The firmware 214 can also store code for execution during initialization of the device 110.

A communications component 216 may interface with the processor 202 to facilitate wired/wireless communication with external systems including, for example, cellular networks, location systems, VoIP networks, local area networks (LAN's), wide area networks (WAN's), metropolitan area networks (MAN's), personal area networks (PAN's), and other networks, which may be implemented using WIFI, WIMAX, combinations and improvements thereof, and the like. The communications component 216 can also include a multimode communication subsystem for providing cellular communications via different cellular technologies. For example, a first cellular transceiver 218 can operate in one mode, for example, GSM, and an Nth transceiver 220 can operate in a different mode, for example UMTS. While only two transceivers 218, 220 are illustrated, it should be appreciated that a plurality of transceivers may be included. The communications component 216 may also include a transceiver 222 for other communication technologies, such as, for example, WIFI, WIMAX, BLUETOOTH, infrared, IRDA, NFC, RF, and the like. The communications components 216 may also facilitate reception from terrestrial radio networks, digital satellite radio networks, Internet based radio service networks, combinations thereof, and the like. The communications component 216 can process data from a network, such as, for example, the network 120, the Internet, a corporate network, a home broadband network, a WIFI hotspot, and the like via an ISP, DSL provider, or broadband provider. The communications component 216 can be used to transmit information to the application rating server 130 for use in providing ratings for computing applications. Also, the communications component 216 can be used to receive ratings information from, e.g., the application rating server 130 and/or web site or other device via the network 120.

An input/output (I/O) interface 224 may be provided for input/output of data and/or signals. The I/O interface 224 may be a hardwire connection, such as, for example, a USB, mini-USB, audio jack, PS2, IEEE 1394, serial, parallel, Ethernet (RJ48), RJ11, and the like, and can accept other I/O devices such as, for example, keyboards, keypads, mice, interface tethers, stylus pens, printers, thumb drives, touch screens, multi-touch screens, touch pads, trackballs, joysticks, microphones, remote control devices, monitors, displays and liquid crystal displays (LCDs), combination thereof, and the like. It should be appreciated that the I/O interface 224 can be used for communication between the device and a network or local device instead of, or in addition to, the communications component 216.

Audio capabilities may be provided by an audio I/O component 226 that may include a speaker for the output of audio signals and a microphone to collect audio signals. The device 110 can include a slot interface 228 for accommodating a subscriber identity system 230 such as, for example, a subscriber identity module (SIM) or universal SIM (USIM). The subscriber identity system 230 instead can be manufactured into the device 110, thereby obviating the need for a slot interface 228. In some embodiments, the subscriber identity system 230 can store certain features, user characteristics, rules, policies, models, contact information, and the like. The subscriber identity system 230 can be programmed by a manufacturer, a retailer, a user, a computer, a network operator, and the like.

The device 110 can further include an image capture and processing system 232 (image system). Photos and/or videos can be obtained via an associated image capture subsystem of the image system 232, for example, a camera. The device 110 may also include a video system 234 for capturing, processing, recording, modifying, and or transmitting video content.

A traffic monitoring component 236 may be included that determines traffic volume generated by use of an application by the device 110. The duration of a traffic session may also be captured. The volume of traffic exchanged via the device 110 may be reported (e.g., in bytes), to the application rating server 130 via the communications component 216 and the network 120. Similarly, the session duration may be reported (e.g., in seconds) to the application rating server 130.

According to an exemplary embodiment, the traffic monitoring component 236 may include a pcap (packet capture) interface, including an application programming interface (API), for capturing network traffic. For example, a library, such as libpcap, and an application, such as tcpdump, may be included for capturing packets for analysis. The application and library may be included as part of the traffic monitoring component 236 and/or as part of the memory 204 and other applications 212, respectively. In addition, or as an alternative, traffic volume may be monitored, e.g., by another component, e.g., the application rating server 130, via the network 120.

A power usage monitoring unit 237 may be included to detect power consumed during use of an application by the device 110 and report the power consumption (e.g., in Joules) to the application rating server 130 via the communications component 216 and the network 120. In an exemplary embodiment, the power usage monitoring unit detects power usage by monitoring the power level of the power source 238. According to an exemplary embodiment, power consumption for a given state is constant for the device 110. Thus, in addition, or as an alternative, the power usage monitoring unit 237 or another component may be used to collect packet traces showing the times of arrival of packets and departure of packets at the device 110. The packet traces may be evaluated, e.g., by the application rating server 130, to infer power usage, as described in more detail below.

The power source 238 may include, e.g., batteries and/or other power subsystems (AC or DC). The power source 238 can interface with an exemplary power system or charging equipment via a power I/O component 240.

According to exemplary embodiments, power consumption and/or traffic volume of computing applications is taken into account in providing ratings for the applications. According to one aspect, delays in packet transmission during use of an application are taken into account in determining power consumed by the application.

In the past, application developers could ignore underlying transport layers, as the transport layers did not affect power consumption. However, with the emergence of wireless devices, such as smartphones, with limited power supplies, the delays in packet transmission across cellular network transport layers have to be taken into account. For example, the UMTS network has a high latency, e.g., >100 msec gap between packets.

The wireless layer supporting an application is based on a state machine, and the performance of the application depends on timing of previous packets. State transitions impact end user experience and generate signaling load. For example, in applications such as Pandora, in which data is sent in large bursts interspersed with advertisements, a large of amount of power is consumed in receiving the advertisements. In fact, the amount of power consumed in receiving advertisements may exceed the power consumed in receiving the large bursts of non-advertisement data.

As another example, applications with a constant bitrate, such as Internet radio broadcasts, consume more power than applications, such as Pandora, with bursty streaming, as the mobile communication device is always in the state for receiving constant bit rate streaming. As can be seen from these examples, channel occupation time and battery life are wasted by applications generating scattered bursts and ignoring the underlying state machine.

Using the UMTS network as an example, an important factor affecting application performance and network energy efficiency is a radio resource control (RRC) state machine. The RRC state machine functions to efficiently utilize limited radio resources and to improve handset battery life. Although the state machine for a UMTS network is described for illustrative purposes, it should be appreciated that the embodiments described applies to state machines used in other types of wireless networks.

Figure 3A:
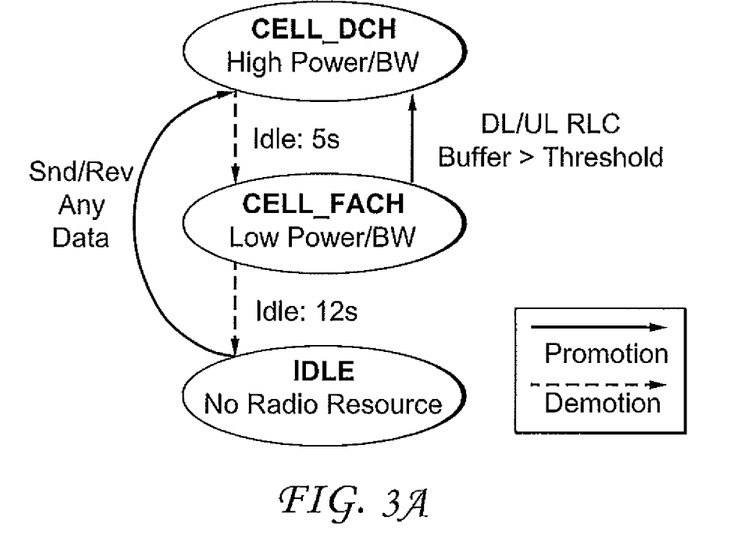
FIGS. 3A and 3B illustrate states of a computing device which may be used to infer power consumed during use of the device according to an exemplary embodiment.
Figure 3B:
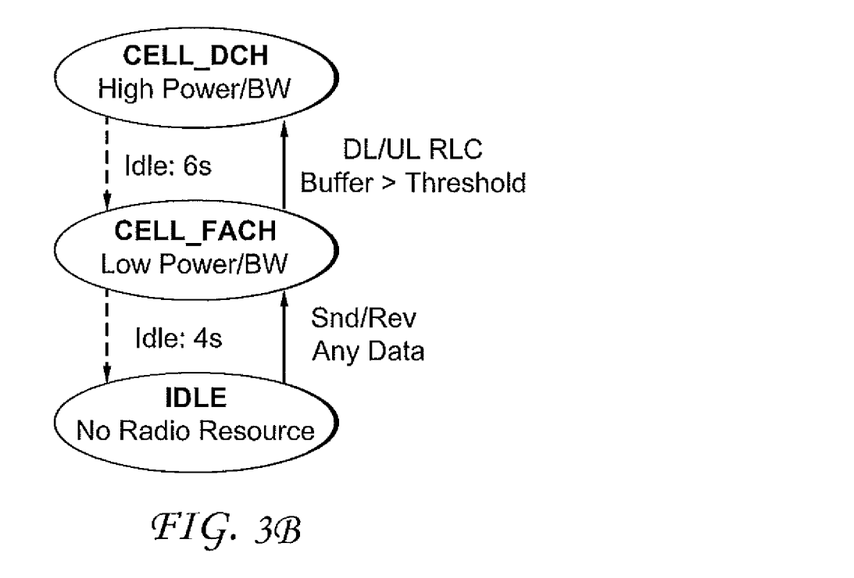

FIGS. 3A and 3B illustrate examples of states of a mobile communication device using different carriers. Each RRC state has different amounts of allocated radio resources and power. These states include CELL_DCH (dedicated channel), CELL-FACH (forward channel) and IDLE. During the CELL_DCH state, a high amount of power (e.g., 600-800 mW) is utilized. Also, a relatively large bandwidth is used for traffic volume, as a physical channel is dedicated for uplink and downlink communications to the mobile device. During the CELL_FACH state, a lower amount of power/bandwidth is utilized (e.g., 55% to 75% of the power utilized during the CELL_DCH state). During the IDLE state, no radio resources are utilized.

Application traffic patterns trigger RRC state transitions which, in turn, affect radio resource utilization, handset energy consumption, and user experience. As shown in FIGS. 3A and 3B, there are two types of RRC state transitions: promotions (indicated with solid lines) and demotions (indicated with dashed lines). Promotions switch from a state with lower radio resource/power consumption to a state with higher radio resource/power consumption, and demotions switch from a state with higher radio resource/power consumption to a state with lower radio resource/power consumption. As shown in FIGS. 3A and 3B, during the transitions between states, there are idle periods. These are due, for example, to promotion delays caused by the exchange of control messages during promotion transitions and/or tail times that occur before a demotion transition. Awareness of the RRC states and their transition behavior is important to ensuring efficient network energy usage.

According to an exemplary embodiment, a computing device, such as the device 110, collects packet traces indicating timing of arrival and departure of packets. The packet traces reflect the idle time during transitions between states. The state of the device 110 is inferred or simulated based on the timing of the packets associated with the application.

The state may be inferred, e.g., at the device 110 or at the application rating server 130 based on the packet traces. Power consumption is inferred based on the simulated or inferred state of the handset.

In addition to impacting the power consumption of a computing device, e.g., the device 110, state transitions affect signaling load across a network, e.g., the network 120. That is, during each state transition, there are control messages exchanged between various components in the network. A large number of state transitions means a large number of control messages are exchanged, and a large signaling load is placed on the network. Conversely, a small number of state transitions means a small number of control messages are exchanged, and a small signaling load is placed on the network. Additionally, different types of state transitions provide different signaling loads. For example, a transition between the IDLE and DCH state creates more signaling load than a transition from the FACH to IDLE state. Thus, according to another aspect, the packet traces collected by a computing device may be used to determine the number and type of state transitions (and hence, the signaling load) occurring while the device is using a particular computing application. The signaling load generated by the use of a computing application (inferred based on state transitions experienced by devices using the computing application) may be compared with the signaling load generated by the use of other computing applications (and/or a default or predetermined signaling load). A signaling load rating for the computing application may be provided based on the comparison. This rating may be combined with other ratings for the computing application or provided separately. The signaling load rating, while somewhat useful for end users, may be particularly useful to application developers, network personnel, etc.

Figure 4:
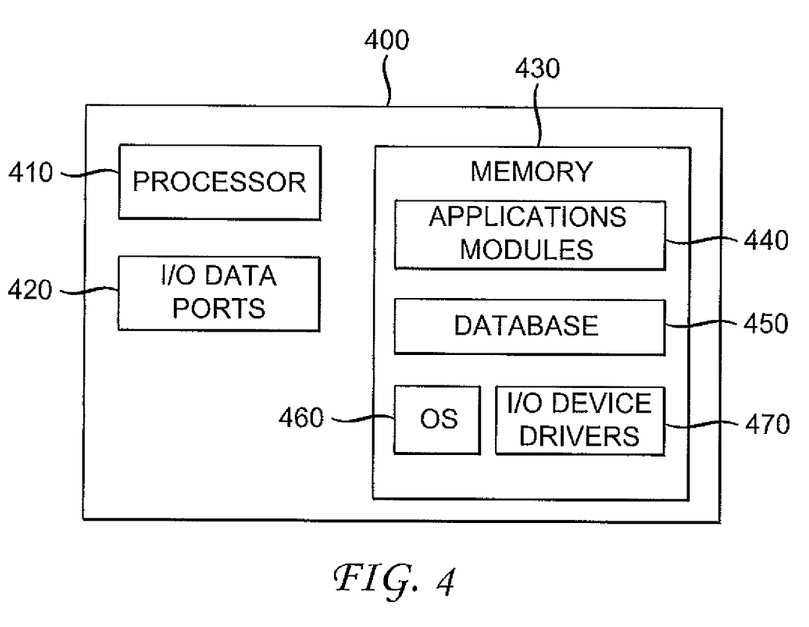
FIG. 4 illustrates a device for rating a computing application according to an exemplary embodiment.

FIG. 4 is a block diagram of a device 400 with which the application rating server 130 may be implemented according to an exemplary embodiment. The device 400 includes a processor 410 that receives information, such as information indicating traffic volume and power usage for an application used by computing devices 110A, 110B and/or 110C, via I/O data ports 420. The I/O data ports 420 can be, for example, an interface including an antenna or other suitable type of transceiver through which data and signals may be transmitted and received. It should be appreciated that the I/O Data Ports 420 can be used for communications with or between the device 400 and/or the network 120, for example.

The processor 410 communicates with a memory 430 via, e.g., an address/data bus (not shown). The processor 410 can be any commercially available or custom processor. The memory 430 is representative of the overall hierarchy of memory devices containing the software and data used to implement the functionality of the device 400. The memory 430 can include, but is not limited to, the following types of devices: processor registers, processor cache, RAM, ROM, PROM, EPROM, EEPROM, flash memory, SRAMD, DRAM, other volatile memory forms, and non-volatile, semi-permanent or permanent memory types; for example, tape-based media, optical media, solid state media, hard disks, combinations thereof, and the like.

As shown in FIG. 4, the memory 430 may include several categories of software and data used in the device 400, including, applications 440, a database 450, an operating system (OS) 460, and input/output (I/O) device drivers 470. As will be appreciated by those skilled in the art, the OS 460 may be any operating system for use with a data processing system. The I/O device drivers 470 may include various routines accessed through the OS 460 by the applications 440 to communicate with devices, and certain memory components. The applications 440 can be stored in the memory 430 and/or in a firmware (not shown) as executable instructions, and can be executed by the processor 410. The applications 440 include various programs that, when executed by the processor 410, implement the various features of the device 400, including comparing traffic volume and power consumed by usage of an application with the traffic volume and power consumed by usage of other applications, providing a rating for the computing application based on the comparison, etc. The applications 440 may also include an application for simulating a state of a computing device, e.g., a mobile communication device, based on a packet trace and inferring power consumption based on the simulated state. The applications 440 may be applied to data stored in the database 450, along with data, e.g., received via the I/O data ports 420. The database 450 represents the static and dynamic data used by the applications 440, the OS 460, the I/O device drivers 470 and other software programs that may reside in the memory. The database 450 may include, for example, information regarding power consumption and traffic volume for various computing applications, information regarding power consumption during various states of use of mobile devices, etc.

While the memory 430 is illustrated as residing proximate the processor 410, it should be understood that at least a portion of the memory 430 can be a remotely accessed storage system, for example, a server on a communication network, a remote hard disk drive, a removable storage medium, combinations thereof, and the like. Thus, any of the data, applications, and/or software described above can be stored within the memory 430 and/or accessed via network connections to other data processing systems (not shown) that may include a local area network (LAN), a metropolitan area network (MAN), or a wide area network (WAN), for example.

It should be understood that FIG. 4 and the description above are intended to provide a brief, general description of a suitable environment in which the various aspects of some embodiments of the present disclosure can be implemented. While the description refers to computer-readable instructions, embodiments of the present disclosure also can be implemented in combination with other program modules and/or as a combination of hardware and software in addition to, or in stead of, computer readable instructions. As indicated above, the term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, hand-held computing devices, mobile communication devices, microprocessor-based, programmable consumer electronics, combinations thereof, and the like.

According to an exemplary embodiment, a rating may be provided for power consumption and another rating may be provided for traffic volume for each application. Alternatively, a rating may be provided encompassing both. Additionally, there may be other ratings, e.g., subjective ratings based on user satisfaction, which may be provided separately or as part of the overall rating.

Figure 5:
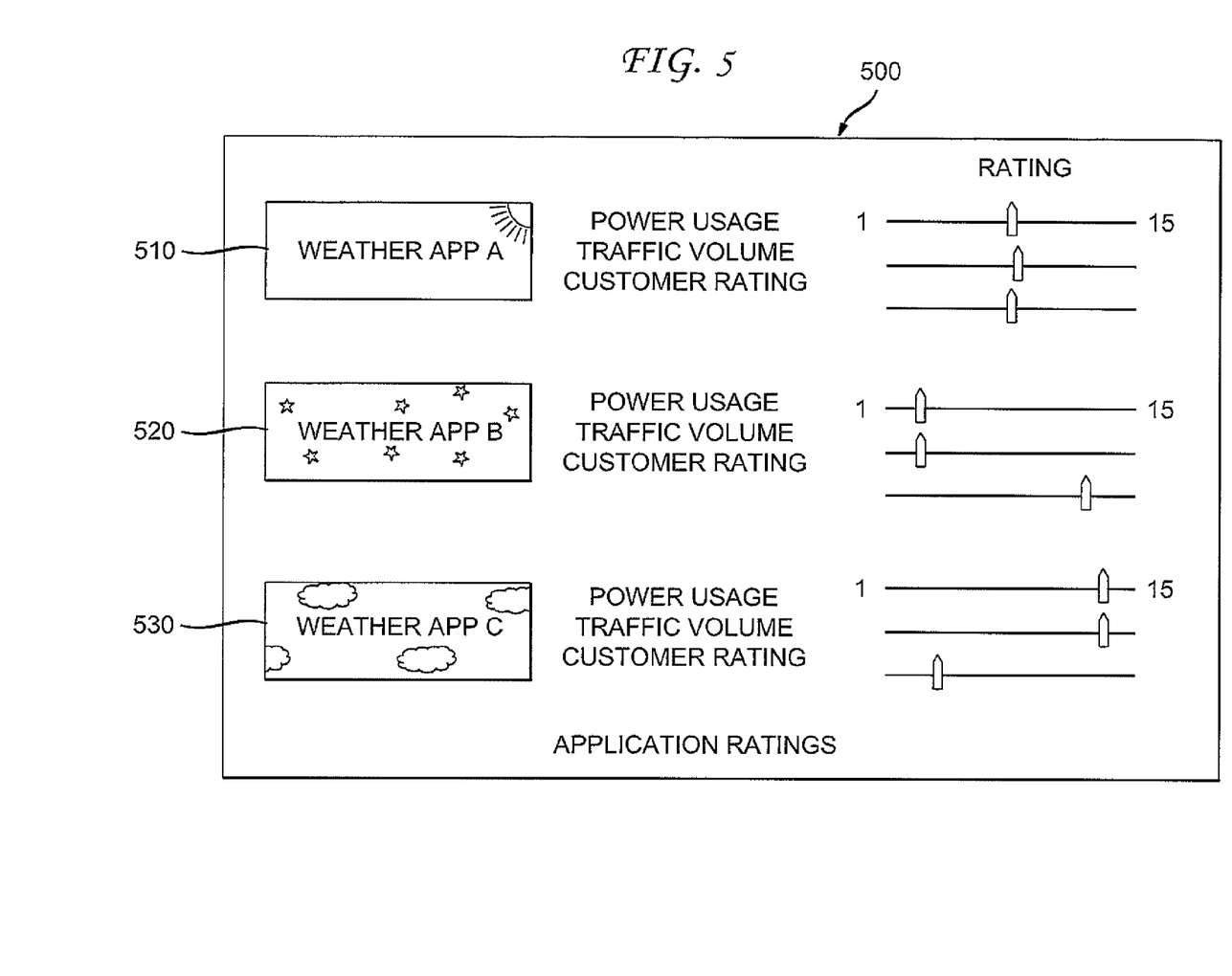
FIG. 5 illustrates an exemplary screen displaying ratings for computing applications that may be provided according to an exemplary embodiment.

FIG. 5 illustrates an exemplary screen displaying ratings for computing applications that may be provided according to an exemplary embodiment. The screen 500 may be presented on a computing device, e.g., the mobile communication devices 110A. Using the screen 500 a user of the mobile communication device 110A may view ratings associated with various computing applications. As an illustrative example, the screen shown in FIG. 5 shows ratings for three weather applications 510, 520, and 530. The ratings include objective ratings for power consumption and traffic volume, as well as a subjective customer rating for each computing application. It should be appreciated that the ratings may be combined as desired. For example, the power consumption and traffic volume ratings may be combined as a single objective rating, or the power usage rating, traffic volume and customer rating may be combined to provide an overall rating. In the example shown in FIG. 5, ratings are provided on a scale of 1 to 15, with one being the worst and 15 being the best. Based on this scale, the weather application A 510 has a rating of about 8 in terms of power usage, traffic volume, and customer rating. The weather application B 520 has low ratings for power consumption and traffic volume, indicating that the application consumes a lot of power and requires a large volume of traffic flow. However, the weather application 520 has a high customer rating reflecting high customer satisfaction. In contrast, the weather application C 530 has high ratings for both power consumption and traffic volume, with a low customer rating. Using ratings such as those shown in FIG. 5, a user is able to make a selection of a computing application based on objective information regarding power consumption and traffic volume and based on subjective information regarding customer satisfaction.

Figure 6:
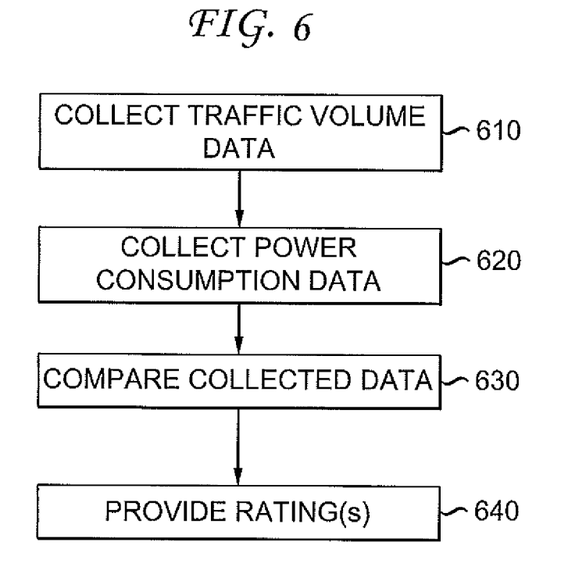
FIG. 6 illustrates a method for providing a rating for a computing application according to an exemplary embodiment.

FIG. 6 illustrates a method for providing a rating for a computing application according to an exemplary embodiment. It should be understood that the steps or other interactions of the illustrated method are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the method can be ended at any time. In certain embodiments, some or all steps of the method, and/or substantially equivalent steps can be performed by execution of computer-executable instructions stored or included on a non-transitory computer-readable medium.

Referring to FIG. 6, data indicating traffic volume generated by usage of a particular computing application is collected at step 610 from computing devices, e.g., devices 110B and 110C, by the application rating server 130 via the network 120. At step 620, data indicating power consumed by usage of the particular computing application is collected, e.g., from the devices 110B and 110C, by the application rating server 130 via the network 120. Power consumption data may be collected based on actual power levels reported by the devices 110B and 110C, or power consumption may be inferred based on simulated states of the devices 110B and 110C, as described above. The power consumption may be inferred, e.g., by the application rating server 130. Alternatively, power consumption may be inferred, e.g., at the devices 110B and 110C and reported to the application rating server 130. At step 630, the application rating server 130 compares the collected traffic volume data and power consumption data with traffic volume data and power consumption data collected for other computing applications. In addition, or as an alternative, the collected data may be compared with default or predetermined traffic volume and/or power consumption data. Although not shown in FIG. 6, the application rating server 130 may collect other information, such as signaling load data, user feedback, etc., in addition to or as an alternative to the traffic volume and power consumption data, and compare such information with similar information collected for other applications and/or default data. Also, although FIG. 6 illustrates steps for collecting both power consumption data and traffic volume data, it should be appreciated that data regarding only power consumption or only traffic volume may be collected, either in combination with other data or alone.

According to an exemplary embodiment, the application rating server 130 may categorize applications such that the data collected for the particular computing application is compared against similar computing applications within the same category. As an alternative or in addition, the application rating sever 130 may compare the data collected for the particular computing application against data collected for a broad variety of computing applications, regardless of category.

At step 640, the application rating server 130 provides ratings for the particular computing application based on the comparison results. The ratings may be broken down individually, e.g., for power consumption, traffic volume, and other information, or the ratings may be combined into an overall rating. The ratings may be provided, e.g., to the computing device 110A, provider of an application store, and/or a website provider via the network 120.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A method comprising:
obtaining, by a system comprising a processor, power consumption data associated with usage of an application on a device, the power consumption data representative of power consumed by the application on the device, wherein obtaining the power consumption data associated with usage of the application on the device comprises
inferring, by the system, a state of the device based on packet traces associated with the application, and
inferring, by the system, the power consumed by the application on the device based on the state of the device;
performing, by the system, a comparison between the power consumption data associated with usage of the application and other power consumption data representative of power consumed by at least one other application; and
determining, by the system, a rating for the application based on the comparison.

2. The method of claim 1, further comprising receiving, by the system, from the device, data representative of traffic volume generated by use of the application on the device.

3. The method of claim 2, wherein the data representative of the traffic volume comprises the traffic volume utilized per a session, a duration of the session, and a frequency of the session.

4. The method of claim 2, further comprising comparing the traffic volume generated by use of the application with traffic volume generated by use of a different application.

5. The method of claim 4, wherein the rating for the application is further based on a result of comparing the traffic volume generated by use of the application with traffic volume generated by use of the different application.

6. The method of claim 2, wherein the data representative of the traffic volume comprises the traffic volume generated during an initial download of the application and the traffic volume generated during subsequent use of the application.

7. The method of claim 1, further comprising:
utilizing the packet traces to determine a signaling load generated by use of the application on the device;
comparing the signaling load generated by use of the application with a signaling load generated by use of a different application; and
determining a signaling load rating based on a result of comparing the signaling load generated by use of the application with the signaling load generated by use of the different application.

8. The method of claim 1, further comprising classifying the application in a category, wherein the at least one other application is also classified in the category.

9. The method of claim 1, further comprising:
obtaining, by the system and via a communication network, signaling load data comprising data representative of a signaling load on the communication network resulting from usage of the application;
comparing the signaling load data with other signaling load data; and
providing a signaling load rating associated with the application based on a result of comparing of the signaling load data with other signal load data.

10. A server comprising:
a communications interface;
a processing unit; and
a memory storing instructions that, when executed by the processing unit, cause the processing unit to perform operations comprising
obtaining power consumption data associated with usage of an application on a device, the power consumption data representative of power consumed by the application on the device, wherein obtaining the power consumption data associated with usage of the application on the device comprises
inferring a state of the device based on packet traces associated with the application, and
inferring the power consumed by the application on the device based on the state of the device,
performing a comparison between the power consumption data associated with usage of the application and other power consumption data representative of power consumed by at least one other application, and
determining a rating for the application based on the comparison.

11. The server of claim 10, wherein the operations further comprise receiving, from the device, data representative of traffic volume generated by use of the application on the device.

12. The server of claim 11, wherein the data representative of the traffic volume comprises the traffic volume utilized per a session, a duration of the session, and a frequency of the session.

13. The server of claim 11, wherein the operations further comprise comparing the traffic volume generated by use of the application with traffic volume generated by use of a different application.

14. The server of claim 13, wherein the rating for the application is further based on a result of comparing the traffic volume generated by use of the application with traffic volume generated by use of the different application.

15. The server of claim 10, wherein the operations further comprise:
utilizing the packet traces to determine a signaling load generated by use of the application on the device;
comparing the signaling load generated by use of the application with a signaling load generated by use of a different application; and
determining a signaling load rating based on a result of comparing the signaling load generated by use of the application with the signaling load generated by use of the different application.

16. A non-transitory computer-readable medium comprising instructions that, when executed by a processor of a server, cause the processor to perform operations comprising:
obtaining power consumption data associated with usage of an application on a device, the power consumption data representative of power consumed by the application on the device, wherein obtaining the power consumption data associated with usage of the application on the device comprises
inferring a state of the device based on packet traces associated with the application, and
inferring the power consumed by the application on the device based on the state of the device;
performing a comparison between the power consumption data associated with usage of the application and other power consumption data representative of power consumed by at least one other application; and
determining a rating for the application based on the comparison.

17. The non-transitory computer-readable medium of claim 16, wherein the operations further comprise:
utilizing the packet traces to determine a signaling load generated by use of the application on the device;
comparing the signaling load generated by use of the application with a signaling load generated by use of a different application; and
determining a signaling load rating based on a result of comparing the signaling load generated by use of the application with the signaling load generated by use of the different application.

* * * * *